(12) United States Patent
Jeong et al.

(10) Patent No.: US 12,355,062 B2
(45) Date of Patent: Jul. 8, 2025

(54) ANODE FOR SECONDARY BATTERY, METHOD OF FABRICATING THE SAME AND LITHIUM SECONDARY BATTERY INCLUDING THE SAME

(71) Applicants: SK INNOVATION CO., LTD., Seoul (KR); SK ON CO., LTD., Seoul (KR)

(72) Inventors: Kwang Ho Jeong, Daejeon (KR); Seung Deok Seo, Daejeon (KR); Jae Young Choi, Daejeon (KR); Sung Do Kim, Daejeon (KR); Jeong A Kim, Daejeon (KR); Do Ae Yu, Daejeon (KR); Yong Seok Lee, Daejeon (KR)

(73) Assignees: SK INNOVATION CO., LTD., Seoul (KR); SK ON CO., LTD., Seoul (KR)

( * ) Notice: Subject to any disclaimer, the term of this patent is extended or adjusted under 35 U.S.C. 154(b) by 66 days.

(21) Appl. No.: 18/465,160

(22) Filed: Sep. 12, 2023

(65) Prior Publication Data

US 2024/0213444 A1 Jun. 27, 2024

(30) Foreign Application Priority Data

Dec. 19, 2022 (KR) ................ 10-2022-0177962

(51) Int. Cl.
| | | |
|---|---|---|
| *H01M 4/134* | (2010.01) | |
| *H01M 4/04* | (2006.01) | |
| *H01M 4/13* | (2010.01) | |
| *H01M 4/133* | (2010.01) | |
| *H01M 4/136* | (2010.01) | |
| *H01M 4/1393* | (2010.01) | |
| *H01M 4/1395* | (2010.01) | |
| *H01M 4/36* | (2006.01) | |
| *H01M 4/38* | (2006.01) | |
| *H01M 4/48* | (2010.01) | |
| *H01M 4/58* | (2010.01) | |
| *H01M 4/587* | (2010.01) | |
| *H01M 4/62* | (2006.01) | |
| *H01M 4/02* | (2006.01) | |

(52) U.S. Cl.
CPC ......... *H01M 4/134* (2013.01); *H01M 4/0404* (2013.01); *H01M 4/13* (2013.01); *H01M 4/133* (2013.01); *H01M 4/136* (2013.01); *H01M 4/1393* (2013.01); *H01M 4/1395* (2013.01); *H01M 4/364* (2013.01); *H01M 4/366* (2013.01); *H01M 4/386* (2013.01); *H01M 4/48* (2013.01); *H01M 4/58* (2013.01); *H01M 4/587* (2013.01); *H01M 4/62* (2013.01); *H01M 4/622* (2013.01); *H01M 4/625* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 11,114,660 B1 * | 9/2021 | Ji .................... | H01M 4/622 |
| 2016/0190548 A1 * | 6/2016 | Yang ................ | H01M 4/134 |
| | | | 429/217 |
| 2018/0040886 A1 * | 2/2018 | Yokoi .............. | H01M 4/36 |
| 2021/0083276 A1 | 3/2021 | Nair et al. | |

FOREIGN PATENT DOCUMENTS

| | | |
|---|---|---|
| CN | 110165187 A | 8/2019 |
| CN | 110649224 A | 1/2020 |
| CN | 113692657 A | 11/2021 |
| JP | 2006-196339 A | 7/2006 |
| JP | 2012-256539 A | 12/2012 |
| JP | 2015-106437 A | 6/2015 |
| JP | 2017-010797 A | 1/2017 |
| KR | 10-1591698 B1 | 2/2016 |
| KR | 10-2019-0035387 A | 4/2019 |
| KR | 10-2020-0073350 A | 6/2020 |
| KR | 10-2020-0089568 A | 7/2020 |
| KR | 10-2020-0132749 A | 11/2020 |
| KR | 2021-0041684 * | 4/2021 |
| KR | 10-2022-0088648 A | 6/2022 |
| WO | 2021/235794 A1 | 11/2021 |

OTHER PUBLICATIONS

Siyuan Pan et al., Integrating SEI into Layered Conductive Polymer Coatings for Ultrastable Silicon Anodes, Advanced Materials, 2022, pp. 1-10, vol. 34, Wiley-VCH GmbH.
Extended European Search Report for European Patent Application No. 23198160.6 issued by the European Patent Office on Jun. 27, 2024.

* cited by examiner

*Primary Examiner* — Laura Weiner
(74) *Attorney, Agent, or Firm* — IP & T GROUP LLP

(57) ABSTRACT

An anode for a lithium secondary battery includes an anode current collector, and an anode active material layer formed on at least one surface of the anode current collector. The anode active material layer includes an anode active material and an anode binder. The anode active material includes a plurality of composite particles, each of the composite particles include a silicon-based active material particle, and a solid electrolyte interphase (SEI) layer formed on at least a portion of a surface of the silicon-based active material particle. A relative standard deviation of thickness values of the SEI layer of the composite particles, which are measured by an X-ray photoelectron spectroscopy (XPS) from 9 different composite particles among the plurality of composite particles after repeating 100 cycles of charging and discharging is 20% or less.

6 Claims, 2 Drawing Sheets

LENGTH DIRECTION

ANODE FOR SECONDARY BATTERY, METHOD OF FABRICATING THE SAME AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2022-0177962 filed on Dec. 19, 2022 in the Korean Intellectual Property Office (KIPO), the entire disclosure of which is incorporated by reference herein.

BACKGROUND

1. Field

The present disclosures relate to an anode for a secondary battery, a method of fabricating the same and a lithium secondary battery including the same.

2. Description of the Related Art

With developments of information and display technologies, secondary batteries which can be charged and discharged repeatedly have been widely employed as power sources of for mobile electronic devices such as camcorders, mobile phones, laptop computers, etc. Recently, battery packs including secondary batteries are being developed and applied as power sources for eco-friendly vehicles such as an electric automobile, a hybrid vehicle, etc.

Examples of secondary batteries include, e.g., a lithium secondary battery, a nickel-cadmium battery, a nickel-hydrogen battery, etc. The lithium secondary battery has been actively developed and applied due to its high operational voltage and energy density per unit weight, a high charging rate, a compact dimension, etc.

In one example, the lithium secondary battery may include an electrode assembly including a cathode, an anode and a separation layer (separator), and an electrolyte immersing the electrode assembly. The lithium secondary battery may further include an outer case having, e.g., a pouch shape accommodating the electrode assembly and the electrolyte.

Recently, as an application range of the lithium secondary battery has expanded, developments of lithium secondary batteries to have higher capacity and higher power have been required. In one example, silicon-based particles with high capacity have been used for an anode active material.

SUMMARY

According to one aspect of the present disclosure, there is provided an anode for a secondary battery having improved life-span property and operational stability.

According to another aspect of the present disclosures, there is provided a method of fabricating an anode for a secondary battery with improved life-span property and operational stability.

According to another aspect of the present disclosures, there is provided a lithium secondary battery having improved life-span property and operational stability.

In one embodiment, an anode for a lithium secondary battery includes an anode current collector, and an anode active material layer formed on at least one surface of the anode current collector. The anode active material layer may include an anode active material and an anode binder.

In some embodiments, the anode active material comprises a plurality of composite particles, each of the composite particles includes a silicon-based active material particle, and a solid electrolyte interphase (SEI) layer formed on at least a portion of a surface of the silicon-based active material particle.

In some embodiments, a relative standard deviation of thickness values of the SEI layer of the composite particles, which are measured by an X-ray photoelectron spectroscopy (XPS) from 9 different composite particles among the plurality of composite particles after repeating 100 cycles of charging and discharging, is 20% or less.

In some embodiments, the thickness value of the SEI layer may be an etching depth at a point where a lithium concentration and a carbon concentration measured by etching a surface of the composite particle using an argon ion gun of the XPS are the same.

In some embodiments, three of the nine different composite particles may be selected from one end portion in a length direction of the anode active material layer, the other three of the nine different composite particles may be selected from the other end portion in the length direction of the anode active material layer, and another three of the nine different composite particles may be selected from a central portion in the length direction of the anode active material layer.

In some embodiments, the silicon-based active material particle may include at least one selected from the group consisting of Si, SiOx (0<x<2), and a Si—C composite.

In some embodiments, each of the composite particles may further include a carbon coating formed on at least a portion of the surface of the silicon-based active material particle.

In some embodiments, the anode active material may further include graphite-based active material particles.

In some embodiments, the anode binder may include a polyacrylic acid-based copolymer.

In some embodiments, a ratio of the number of moles of repeating units derived from polyacrylic acid relative to the total number of moles of repeating units included in one molecule of the polyacrylic acid-based copolymer may be greater than 0.25 and less than 0.7.

In some embodiments, a ratio of the number of moles of repeating units derived from polyacrylic acid relative to the total number of moles of repeating units included in one molecule of the polyacrylic acid-based copolymer may be in a range from 0.4 to 0.55.

In some embodiments, a ratio of an average of the thickness values of the SEI layer measured after the 100 cycles of charging and discharging relative to an average of thickness values of the SEI layer measured after a formation charging and discharging may be in a range from 1 to 3.6.

A lithium secondary battery may include an anode for a lithium secondary battery according to the above-described embodiments, and a cathode facing the anode.

In one method of fabricating an anode for a lithium secondary battery, a plurality of silicon-based active material particles are prepared. An anode active material including the plurality of silicon-based active material particles and an anode binder including a polyacrylic acid-based copolymer are mixed in a solvent to form a mixture. The mixture is diluted with a solvent to prepare a slurry. The slurry is coated on at least one surface of an anode current collector. A solid content contained in the mixture based on a total weight of the mixture may be in a range from 50 wt % to 80 wt %.

In some embodiments, the plurality of silicon-based active material particles and a carbon source gas may be mixed and fired to form a carbon coating on at least a portion of a surface of each of the plurality of silicon-based active material particles.

In some embodiments, the anode active material and the anode binder may be mixed in the solvent for 10 minutes to 110 minutes to form the mixture.

According to one aspect of the present disclosures, an anode for a lithium secondary battery may include an anode current collector, and an anode active material layer formed on at least one surface of the anode current collector. The anode active material layer may include an anode active material and an anode binder. The anode active material may include a plurality of composite particles, each of the composite particles may include a silicon-based active material particle, and a solid electrolyte interphase (SEI) layer formed on at least a portion of a surface of the silicon-based active material particle. The SEI layer may be formed by mixing the silicon-based active material particle with an anode binder comprising a copolymer, and the silicon-based active material particle may include a carbon layer formed on the silicon-based active material particle from a carbon source gas. The carbon layer may be configured to suppress a reaction between the silicon-based active material particle and an electrolyte solution during a life-span of the lithium secondary battery.

In some embodiments, the carbon layer may include a total weight of the composite particle ranging from 1 wt % to 8 wt %.

In some embodiments, the SEI layer may include a layer having a lithium concentration decreasing from an exterior of the composite particle toward an interior of the composite particle, and a carbon concentration increasing from the exterior of the composite particle toward the interior of the composite particle. A thickness of the SEI layer may be defined by a position in the SEI layer where the lithium concentration and the carbon concentration are the same.

In some embodiments, a relative standard deviation of a first thickness value of the SEI layer prior to charging and discharging 100 times to a second thickness value of the SEI layer after the charging and discharging 100 times may be 20% or less.

In some embodiments, the anode active material layer may further include graphite and carbon nanotubes, and the copolymer may include a polyacrylic acid-polyvinyl alcohol copolymer.

In various embodiments, an anode for a lithium secondary battery includes an anode active material layer including an anode active material and an anode binder.

The anode active material may include a plurality of composite particles including a silicon-based active material particle and a solid electrolyte interface (SEI) layer formed on at least a portion of a surface of the silicon-based active material particle. In one example, the silicon-based active material particles may provide high capacity properties to the anode active material. In one example, resistance of the anode active material may be reduced and side reactions with the electrolyte solution may be prevented by the SEI layer. Accordingly, capacity and life-span properties of the anode for a lithium secondary battery may be improved.

In some embodiments, in the anode for a lithium secondary battery, a relative standard deviation of thickness values of the SEI layer obtained by performing an X-ray photoelectron spectroscopy (XPS) analysis on 9 different composite particles among a plurality of the composite particles after repeating charging and discharging 100 times is 20% or less. Within the above range, the SEI layer may be formed to have a uniform thickness on the surfaces of the different composite particles. Accordingly, the side reactions between the silicon-based active material particles and the electrolyte solution during repeated charging and discharging may be suppressed, and the life-span properties of the lithium secondary battery may be improved.

In some embodiments, the anode binder may include a polyacrylic acid-based copolymer. In one example, the polyacrylic acid-based copolymer may serve as a hydrophilic binder containing a large amount of oxygen functional groups. The oxygen functional group may contribute to the formation of the thin and uniform SEI layer having a high strength. Accordingly, the life-span properties of the lithium secondary battery may be improved.

DETAILED DESCRIPTION OF THE EMBODIMENTS

Figure 1:
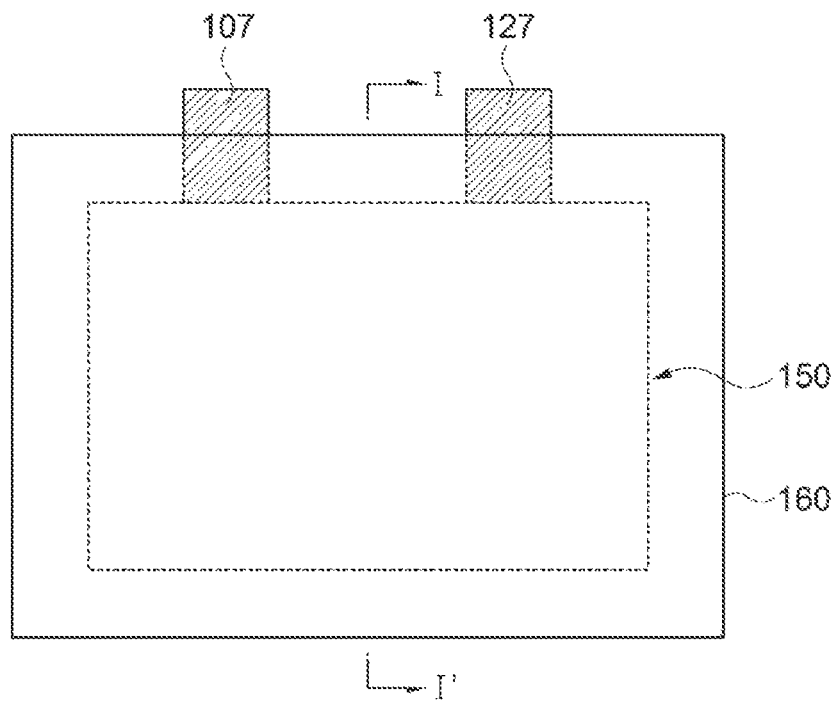
FIGS. 1 and 2 are a schematic plan view and a schematic cross-sectional view, respectively, illustrating a secondary battery in accordance with the disclosed embodiments.

According to embodiments of the present disclosure, an anode for a secondary battery including an anode active material and an anode binder is provided. Further, a method of fabricating the anode is also provided. According to embodiments of the present disclosure, a lithium secondary battery including the anode is also provided.

Hereinafter, the present disclosure will be described in detail with reference to the described embodiments. However, those skilled in the art will appreciate that such embodiments are provided to further illustrate the present invention and do not limit the subject matters disclosed in the detailed description.

With the developments of lithium secondary batteries having higher capacity and power, a solid electrolyte interphase (SEI) layer may be formed on surfaces of silicon-based particles. Since the silicon-based particles have a relatively high volume expansion ratio, the SEI layer may be non-uniformly formed which can deteriorate life-span properties of the lithium secondary battery. Accordingly, an inventive design of an anode having improved life-span properties while having a uniform SEI layer is provided in the present disclosure.

A detailed structure of a lithium secondary battery including an anode for a lithium secondary battery (hereinafter, that may be abbreviated as an "anode") will be described later with reference to FIGS. 1 and 2.

In various embodiments, the anode includes an anode current collector and an anode active material layer formed on at least one surface of the anode current collector.

In one example, the anode current collector may include a metal that has high conductivity, improved adhesion to an anode slurry, and is not reactive within a voltage range of a lithium secondary battery. For example, the anode current collector may include copper, stainless steel, nickel, titanium or an alloy or combination thereof. The anode current collector may include for example copper or stainless steel surface-treated with carbon, nickel, titanium or silver.

The anode active material layer may include an anode active material for a lithium secondary battery (hereinafter referred to as an "anode active material") and an anode binder.

In one embodiment, the anode active material may include a plurality of composite particles including silicon-based active material particles and a solid electrolyte interphase (SEI) layer formed on at least a portion of a surface of the silicon-based active material particle.

In one example, the silicon-based active material particles may provide high capacity properties to the anode active material.

In some embodiments, the composite particle may further include a carbon coating formed on at least a portion of the surface of the silicon-based active material particle. Accordingly, the resistance of the anode active material may be reduced and side reactions with an electrolyte solution may be prevented. Thus, capacity and life-span properties of the anode active material may be improved.

In one example, the silicon-based active material particle may include at least one selected from the group consisting of Si, SiOx (0<x≤2) and a Si—C composite.

In another example, the Si—C composite may include a metallurgical grade silicon.

In another example, the Si—C composite may include a porous structure in which a silicon-containing coating is formed on a porous carbon particle including a plurality of pores. For example, the silicon-containing coating may be formed at an inside of the pores and/or a surface of the porous carbon particle. Accordingly, cracks due to a difference of volume expansion ratios between carbon and silicon during charging and discharging of the lithium secondary battery may be prevented.

In another example, the Si—C composite may include a particle in which silicon elements and carbon elements are aggregated and integral with each other.

In some embodiments, the silicon-based active material particle may be SiOx (0<x≤2), or SiOx (0<x<2). In this case, the volume expansion ratio may be reduced as compared to that of Si, and the life-span properties may be improved.

According to some embodiments, the silicon-based active material particle may be doped with an auxiliary element to reduce resistance and improve power characteristics.

In one example, the auxiliary element doped into the silicon-based active material particle may include at least one metal selected from the group consisting of Li, Mg, Al, Ca, Fe, Ti and V. In another embodiment, the auxiliary element may include Li or Mg.

In one example, the carbon coating may include carbon or a conductive polymer. For example, the conductive polymer may include polyacetylene, polyaniline, polypyrrole and/or polythiophene.

An electron affinity between the anode active material and the anode binder may be improved by the carbon coating. Accordingly, the composite particles may be protected by the anode binder.

In some embodiments, an amount of the carbon coating may be in a range from 1 wt % to 8 wt % based on a total weight of the composite particle. Within this range, the side reaction with the electrolyte solution may be sufficiently suppressed while preventing a capacity reduction of the anode active material to enhance the life-span properties.

In one example, the SEI layer may be formed on the surface of the composite particle through a reaction between the silicon-based active material particle and the electrolyte solution. For example, the side reaction between the silicon-based active material particle and the electrolyte solution may be suppressed by the SEI layer. Accordingly, the life-span properties of the lithium secondary battery may be improved.

In various embodiments, the SEI layer may include LiF. In some embodiments, a portion of the SEI layer may include LiF, and another portion of the SEI layer may include a carbonate-based compound. For example, a portion of the SEI layer in contact with an outside may include LiF as a main component, and a portion of the SEI layer in contact with the silicon-based active material particle may include the carbonate-based compound as a main component.

In a case that a thickness of the SEI layer of the composite particle may be non-uniform, the SEI layer may be repeatedly formed, the electrolyte solution may be exhausted and a capacity retention of the lithium secondary battery during repeated charging and discharging may be lowered.

According to various embodiments of the present disclosure, a relative standard deviation of thickness values of the SEI layer (measured by an X-ray photoelectron spectroscopy (XPS) from for example 9 different composite particles among the plurality of composite particles after repeating 100 cycles of charging and discharging) may be 20% or less, or 18% or less. Within this range(s), the SEI layer may be formed to have a uniform thickness on the surfaces of the different composite particles. Accordingly, the side reactions between the silicon-based active material particles and the electrolyte solution during repeated charging and discharging may be suppressed, and the life-span properties of the lithium secondary battery may be improved.

In some embodiments, the relative standard deviation may be 5% or more, 10% or more, 14.1% or more, or 14.8% or more.

The term "after 100 cycles of charging and discharging" as used herein may indicate a state after repeating charging and discharging 100 times for the anode and/or a lithium secondary battery including the anode.

For example, the thickness values of the SEI layer may be measured through the XPS at nine different points of the anode active material layer included in the anode after 100 cycles of charging and discharging. The relative standard deviation of the nine measured SEI layer thickness values can be calculated.

In some embodiments, the relative standard deviation may be defined as a value multiplied by 100 after dividing a standard deviation of the thickness values of the SEI layer measured for the nine different composite particles by an average of the corresponding values.

In some embodiments, three of the nine different composite particles may be selected from one end portion of the anode active material layer in a length direction extending laterally across a surface of the anode current collector, and the other three of the nine different composite particles may be selected from the other end portion of the anode active material layer in the length direction of the anode active material layer, and another three of the nine different composite particles may be selected from a central portion of the anode active material layer in the length direction. Accordingly, a degree of uniformity of the thickness of the SEI layer of the composite particles present in each portion of the anode active material layer can be measured.

In some embodiments, the surface of the composite particle may be etched using an argon ion gun of the XPS to determine concentrations of a lithium element and a carbon element in the SEI layer according to an etching depth.

In one example, the thickness value of the SEI layer may be defined as an etching depth at a point where the measured concentrations of the lithium element and the carbon element are substantially the same.

For example, surfaces of nine different composite particles may be etched using an argon ion gun of the XPS to obtain a graph showing the concentrations of the lithium element and the carbon element according to the etching depth. The thickness value of the SEI layer may be an etching depth at an intersection of a lithium element concentration line and a carbon element concentration line in the graph.

From the above-described measurement, reliability and reproducibility of the measured thickness of the SEI layer may be improved.

In some embodiments, the anode active material may further include graphite-based active material particles. For example, the graphite-based active material particle may include at least one selected from the group consisting of artificial graphite and natural graphite.

In one example, a content of the graphite-based active material particles relative to a total weight of the anode active material may be in a range from 30 wt % to 90 wt %. Within the above range, the life-span properties may be improved while suppressing capacity degradation of the anode active material.

The anode active material layer may include an anode binder together with the anode active material as described above.

In some embodiments, the anode binder may include a polyacrylic acid-based copolymer.

The term "polyacrylic acid-based copolymer" as used herein may refer to a copolymer formed by a copolymerization of polyacrylic acid and another polymer.

For example, the polyacrylic acid-based copolymer may serve as a hydrophilic binder containing a large amount of oxygen functional groups. The oxygen functional group may contribute to the formation of a thin and uniform SEI layer with high strength. Accordingly, the life-span properties of the lithium secondary battery may be improved.

For example, the other polymer copolymerized with polyacrylic acid may include polyvinyl alcohol.

In some embodiments, the polyacrylic acid-based copolymer may include repeating units derived from polyacrylic acid.

For example, a ratio of the number of moles of repeating units derived from polyacrylic acid based on a total number of moles of repeating units included in one molecule of the polyacrylic acid-based copolymer may be greater than 0.25 and less than 0.7, e.g., from 0.4 to 0.55. Within this range, the anode binder may be uniformly bonded to the composite particles to form the uniform SEI layer, and a hydrophilicity of the anode binder may be properly maintained to improve the bonding with the anode active material.

In some embodiments, a ratio of an average of the thickness values of the SEI layer measured after 100 cycles of charging and discharging relative to an average of thickness values of the SEI layer measured after formation charging and discharging may be in a range from 1 to 3.6, e.g., from 1 to 2.5. Within this range, a change ratio of the thickness of the SEI layer may be maintained at a low level during repeated charging and discharging. Accordingly, driving stability and the life-span properties of the lithium secondary battery may be improved.

Hereinafter, a manufacturing method according to various embodiments of the above-described anode for a lithium secondary battery is provided.

A plurality of silicon-based active material particles are prepared.

In one embodiment, a silicon source may be mixed and fired to prepare the plurality of silicon-based active material particles.

For example, the silicon source may include at least one selected from the group consisting of silicon and silicon dioxide ($SiO_2$). In one embodiment, the silicon source may include a mixture of silicon and silicon dioxide.

In one example, the silicon source may be mixed, introduced into a reactor, and fired at a temperature of 400° C. to 800° C. under a vacuum atmosphere. The mixture of the calcined silicon source may be cooled, pulverized and classified to obtain a plurality of silicon-based active material particles.

In another embodiment, the plurality of silicon-based active material particles may include silicon monoxide (SiO).

In some embodiments, the prepared silicon-based active material particles and a carbon source gas may be mixed and fired to form a carbon coating on at least a portion of a surface of the silicon-based active material particle.

For example, the carbon source gas may include a mixed gas of a methane gas and an argon gas.

In some embodiments, the methane gas may be replaced with an ethylene gas, a propylene gas or an acetylene gas, or may be used together with the ethylene gas, the propylene gas or the acetylene gas.

In some embodiments, the carbon coating may be formed by a chemical vapor deposition (CVD). For example, the carbon source gas may be injected into the plurality of silicon-based active material particles and fired at a temperature from about 400° C. to about 1200° C. to form the carbon coating. For example, a ramping rate during the firing may be from 5° C./min to 20° C./min, and the firing may be performed for 60 minutes to 360 minutes.

In various embodiments, the anode active material including the plurality of silicon-based active material particles and the anode binder including the above-described polyacrylic acid-based copolymer may be mixed in a solvent to form a mixture For example, the solvent may include deionized water.

In one example, the silicone-based active material particles and the polyacrylic acid-based copolymer may be combined by the mixing. For example, the silicon-based active material particles and the polyacrylic acid-based copolymer may be combined to form secondary particles.

In some embodiments, a solid content in the mixture based on a total weight of the mixture may be in a range from 50 wt % to 80 wt %, e.g., from 60 wt % to 70 wt %. Within this range(s), the hydrophilic polyacrylic copolymer may be sufficiently mixed and combined with the relatively hydrophobic anode active material. Accordingly, when the silicon-based active material particles contact the electrolyte solution, the SEI layer may be uniformly formed, and the life-span properties of the lithium secondary battery may be improved.

The solid content may include, e.g., the anode active material, the anode binder, a conductive material, and/or a thickener.

In some embodiments, the mixture may be formed by mixing the anode active material and the anode binder in a solvent for 10 minutes to 110 minutes, or for 25 minutes to 50 minutes. Within this range(s), an excessive thickness increase of the SEI layer may be prevented while ensuring a sufficient bond between the silicon-based active material particles and the polyacrylic copolymer. Accordingly, the capacity retention of the lithium secondary battery during repeated charging and discharging may be improved.

In one example, the mixture may further include the thickener and/or the conductive material.

For example, the thickener may include carboxymethyl cellulose (CMC).

The conductive material may be included to promote electron mobility between active material particles. For example, the conductive material may include a carbon-based material such as for example one or more of graphite, carbon black, graphene, carbon nanotube, etc., or a metal-based material including tin, tin oxide, titanium oxide, a perovskite material such as $LaSrCoO_3$ and $LaSrMnO_3$, etc.

In various embodiments, the mixture may be diluted in a solvent (e.g., pure water) to form a slurry. A viscosity of the slurry may be adjusted by the dilution, so that a coating property of the slurry may be improved. For example, a solid content contained in the slurry may be adjusted by the dilution to about 40 wt % to 50 wt % based on a total weight of the slurry.

In various embodiments, the slurry may be coated on an anode current collector, and then dried and pressed to form an anode. For example, the slurry may be coated on at least one surface of the anode current collector, and then dried and pressed to form the anode active material layer. Accordingly, the anode including the anode current collector and the anode active material layer may be obtained.

In one example, the anode may contact the electrolyte solution in a lithium secondary battery. For example, the above-described SEI layer may be formed on the surface of the composite particle after the anode contacts the electrolyte solution and/or after charging and discharging the lithium secondary battery including the anode.

In some embodiments, a relative standard deviation of thickness values of the SEI layer (measured by an X-ray photoelectron spectroscopy (XPS) of 9 different composite particles among the plurality of composite particles after repeating 100 cycles of charging and discharging) may be 20% or less. Accordingly, the SEI layer having a uniform thickness may be formed to enhance the life-span properties of the lithium secondary battery. The present disclosure is not limited to the use of 9 different composite particles, and more or less particles could be used for a standard deviation determination.

Figure 2:
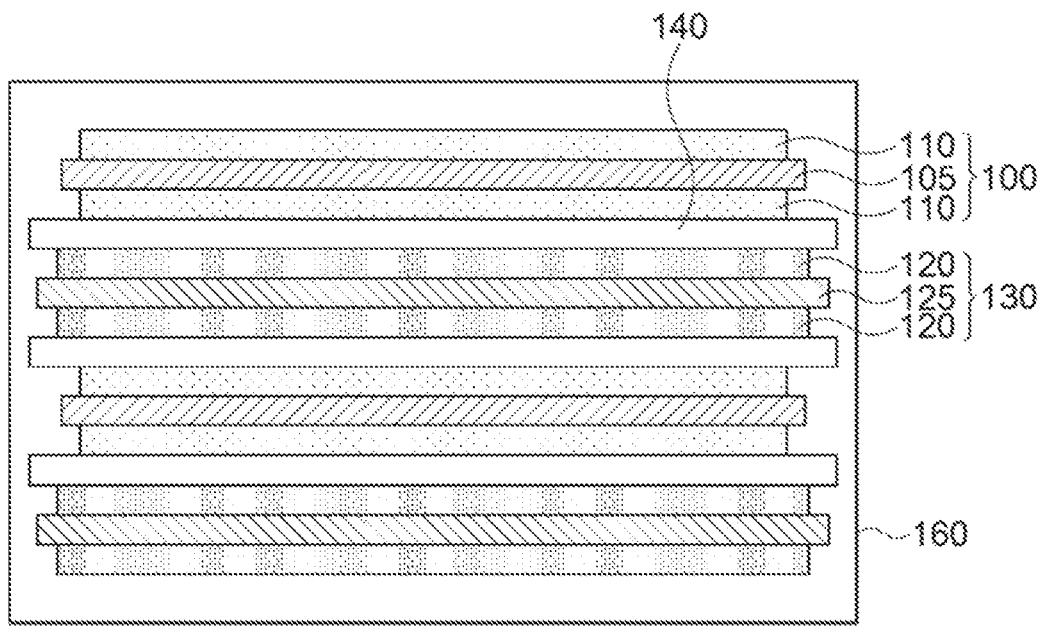

FIGS. 1 and 2 are a schematic plan view and a schematic cross-sectional view, respectively, illustrating a lithium secondary battery according to various embodiments.

Referring to FIGS. 1 and 2, the lithium secondary battery may include the above-described anode 130 and a cathode 100 facing the anode 130.

For example, the cathode 100 may include a cathode current collector 105 and a cathode active material layer 110 disposed on at least one surface of the cathode current collector 105.

A cathode active material may include a compound capable of reversibly intercalating and de-intercalating lithium ions. For example, the cathode active material may include a lithium-nickel metal oxide.

For example, the lithium-nickel metal oxide may further include at least one of cobalt (Co) and manganese (Mn). In some embodiments, the cathode active material may include a Ni—Co—Mn (NCM)-based lithium oxide.

The lithium-nickel metal composite oxide may have a layered structure or a crystal structure represented by Chemical Formula 1 below.

$$Li_xNi_aM_bO_{2+z}$$ 

In Chemical Formula 1, $0.9 \le x \le 1.2$, $0.6 \le a \le 0.99$, $0.01 \le b \le 0.4$ and $-0.5 \le z \le 0.1$. As mentioned above, M may include Co and/or Mn.

In some embodiments, a molar ratio or a concentration x of Ni in Chemical Formula 1 may be 0.8 or more, may exceed 0.8 in an embodiment, and may be greater than 0.98 in an embodiment.

Ni may serve as a transition metal related to power and capacity of the lithium secondary battery. Thus, as described above, a high-Ni composition may be employed to the lithium-nickel metal oxide particles, so that a high-power cathode and a high-power lithium secondary battery may be provided.

However, as the content of Ni increases, long-term storage stability and life-span stability of the cathode or secondary battery may be relatively degraded. In various embodiments, life-span stability and capacity retention properties may be improved by Mn while maintaining electrical conductivity by Co.

The chemical structure represented by Chemical Formula 1 indicates a bonding relation included in the layered structure or the crystal structure of the cathode active material and is not intended to exclude other additional elements. For example, M includes Co and/or Mn, and Co and Mn may serve as main active elements of the cathode active material together with Ni. Chemical Formula 1 is provided to express the bonding relation of the main active elements and should be understood as a formula encompassing introduction and substitution of additional elements.

In some embodiments, an auxiliary element may be further included in addition to the main active element to enhance chemical stability of the cathode active material or the layered structure/crystal structure. The auxiliary element may be incorporated into the layered structure/crystal structure to form a bond, and it should be understood that this case is also included within the chemical structure represented by Chemical Formula 1.

The auxiliary elements may include, e.g., at least one of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element may act as an auxiliary active element such as Al which may contribute to the capacity/power activity of the cathode active material together with Co or Mn.

For example, the cathode active material or the lithium-nickel metal oxide may have a layered structure or a crystal structure represented by Chemical Formula 1-1 below.

$$Li_xNi_aM1_{b1}M2_{b2}O_{2+z}$$ 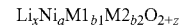

In Chemical Formula 1-1, M1 may include Co and/or Mn. M2 may include the above-described auxiliary element. In Chemical Formula 1-1, $0.9 \le x \le 1.2$, $0.6 \le a \le 0.99$, $0.01 \le b1 + b2 \le 0.4$, and $-0.5 \le z \le 0.1$.

The cathode active material may further include a coating element or a doping element. For example, an element substantially the same as or similar to the above-mentioned auxiliary elements may be used as a coating element or a doping element. For example, the above-mentioned auxiliary elements may be used alone or in combination of two or more therefrom as the coating element or the doping element.

The coating element or the doping element may be present on the surface of the lithium-nickel metal oxide particle or penetrate through the surface of the lithium-nickel metal oxide particle to be included in the bonding structure represented by Chemical Formula 1 or Chemical Formula 1-1.

A cathode slurry may be prepared by mixing and stirring the above-described cathode active material with a binder, a conductive material and/or a dispersive agent in a solvent. The cathode slurry may be coated on at least one surface of a cathode current collector 105, and then dried and pressed to form the cathode 100.

The cathode current collector 105 (and anode current collector 125) may include stainless steel, nickel, aluminum, titanium or an alloy thereof. The cathode current collector 105 may include aluminum or stainless steel surface-treated with carbon, nickel, titanium or silver.

A non-aqueous solvent may be used as the solvent. For example, N-methyl-2-pyrrolidone (NMP), dimethylformamide, dimethylacetamide, N,N-dimethylaminopropylamine, ethylene oxide, tetrahydrofuran, etc., may be used as the solvent.

The binder may include, e.g., an organic-based binder such as one or more of vinylidene fluoride-hexafluoropropylene copolymer (PVDF-co-HFP), polyvinylidenefluoride (PVDF), polyacrylonitrile, polymethylmethacrylate, etc., or an aqueous binder such as styrene-butadiene rubber (SBR) that may be used together with a thickener such as carboxymethyl cellulose (CMC).

In one example, a PVDF-based binder may be used as the cathode binder. In this case, an amount of the binder for forming the cathode active material layer 110 may be reduced, and a content of the cathode active material may be relatively increased. Thus, power and capacity of the lithium secondary battery may be improved.

The conductive material may include a material which is the same or similar to that included in the anode.

In some embodiments, a separator 140 may be interposed between the cathode 100 and the anode 130. The separator 140 may include a porous polymer film formed of a polyolefin-based polymer such as for example one or more of an ethylene homopolymer, a propylene homopolymer, an ethylene/butene copolymer, an ethylene/hexene copolymer, an ethylene/methacrylate copolymer, etc. The separator 140 may also include a nonwoven fabric formed of a high melting point-glass fiber, a polyethylene terephthalate fiber, etc.

In various embodiments, an electrode cell may be defined by the cathode 100, the anode 130 and the separator 140, and a plurality of the electrode cells may be stacked to form an electrode assembly 150 in the form of a jelly roll. In one example, the electrode assembly 150 may be formed by winding, stacking or folding of the separator 140.

The electrode assembly 150 may be accommodated in a case 160 together with an electrolyte to define a lithium secondary battery. In various embodiments, a non-aqueous electrolyte solution may be used as the electrolyte.

The non-aqueous electrolyte solution may include a lithium salt and an organic solvent. For example, the lithium salt may be expressed as $Li^+X^-$. For example, the anion (X–) of the lithium salt may include one or more of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., one or more of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulfolane, gamma-butyrolactone, propylene sulfite, tetrahydrofuran, etc. These may be used alone or in a combination thereof.

As illustrated in FIG. 1, electrode tabs (anode tab and cathode tab) may protrude from the cathode current collector 105 and the anode current collector 125 included in each electrode cell to extend to one side of the case 160. The electrode tabs may be fused together along one side of the case 160 to form electrode leads (a cathode lead 107 and an anode lead 127) extending or exposed to an outside of the case 160.

The lithium secondary battery may be fabricated into a cylindrical shape using a can, a prismatic shape, a pouch shape, a coin shape, etc.

Hereinafter, examples are provided to more concretely describe the present disclosure. However, the following examples are only given for illustrating the present inventive concepts and those skilled in the related art will understand that various alterations and modifications are possible within the scope of the present invention.

Examples 1 to 9 and Comparative Examples 2 to 4

(1) Fabrication of Anode
1) Preparation of Silicon-Based Active Material Particles
Si/C anode active materials manufactured by Group14 Technologies (Woodinville, WA 98072) were used as silicon-based active material particles.
2) Preparation of Anode Binder
A polyacrylic acid-polyvinyl alcohol copolymer was used as an anode binder.

Specifically, the polyacrylic acid-polyvinyl alcohol copolymer was prepared by copolymerizing monomers of polyacrylic acid and polyvinyl alcohol and then performing an acetate reaction.

An input amount of the monomer of polyacrylic acid (PAA) was adjusted so that a ratio (PAA-derived repeating unit mole ratio in Table 1) of the number of moles of repeating units derived from polyacrylic acid to a total number of moles of repeating units included in one molecule of the polyacrylic acid-polyvinyl alcohol copolymer was as shown in Table 1 below.
3) Fabrication of Anode
85.8 wt % of artificial graphite, 11 wt % of the above-prepared silicon-based active material particles, 2.7 wt % of the above-prepared polyacrylic acid-polyvinyl alcohol copolymer and 0.5 wt % of carbon nanotube (CNT) as a conductive material were mixed in a deionized water solvent to form an anode mixture.

An amount of deionized water was adjusted so that a solid content (solid content in Table 1) contained in the anode mixture based on a total weight of the anode mixture was as shown in Table 1 below.

The mixing was performed for the times shown in Table 1 below (mixing time in Table 1).

After the mixing, pure water was added to dilute the slurry to prepare an anode slurry having a solid content of 40 wt % and a viscosity from 5,000 cP to 7,000 cP.

The anode slurry was coated on a copper substrate, dried and pressed to form an anode active material layer. Accordingly, an anode including an anode current collector (a copper substrate) and the anode active material layer was obtained.
(2) Fabrication of Lithium Secondary Battery
$LiNi_{0.8}Co_{0.1}Mn_{0.1}O_2$ as a cathode active material, Denka Black from Denka Company Limited (Tokyo JAPAN) as a conductive material and polyvinylidene fluoride (PVDF) as a binder were mixed in a weight ratio of 95.5:3:1.5 to prepare a cathode mixture. The cathode mixture was uniformly coated on an aluminum foil having an initial thickness of 12.0 μm, dried and pressed to prepare a cathode including a cathode active material layer on a current collector.

The cathode and the anode prepared as described above were each notched to a predetermined size, and stacked with a separator (polyethylene, thickness: 15 μm) interposed therebetween to form an electrode cell. Each tab portion of the cathode and the anode was welded.

The welded assembly of the cathode/separator/anode was inserted in a pouch, and three sides of the pouch except for an electrolyte injection side were sealed. The tab portions were also included in the sealing portions. An electrolyte solution was injected through the electrolyte injection side, and then the electrolyte injection side was also sealed. Impregnation was performed for 12 hours or more to obtain a pouch cell having a capacity of 80 Ah.

In a preparation of the electrolyte solution, a 1M $LiPF_6$ solution was prepared using a mixed solvent of EC/EMC (3:7; volume ratio), and 2 vol % of FEC was added to the solution based on a total volume of the electrolyte solution.

After the fabrication of the pouch cell, a pre-charging was performed for 36 minutes with a current corresponding to 0.25C, where C is the rated current of the battery. After 1 hour, a degassing was performed and an aging was performed for 24 hours or more. Thereafter, a formation charging and discharging was performed (charging condition of constant current and constant voltage until a cut-off current condition is reached CC-CV 0.2C 3.9V 0.05C CUT-OFF, discharging condition CC 0.2C 2.5V CUTOFF until a cut-off voltage condition is reached).

After the formation charging and discharging, composite particles having an SEI layer formed on at least a portion of the surface of the silicon-based active material particle were formed.

Thereafter, a standard charging and discharging was performed (charging condition CC-CV 0.33C 4.2V 0.05C CUT-OFF, discharging condition CC 0.33C 2.5V CUT-OFF)

Comparative Example 1

An anode and a lithium secondary battery were fabricated by the same methods as those in Example 2, except that 1.2 wt % of carboxymethyl cellulose (CMC) and 1.5 wt % of styrene-butadiene rubber (SBR) were used as the anode binder instead of 2.7 wt % of the polyacrylic acid-polyvinyl alcohol copolymer.

Experimental Example (1) XPS Analysis: Calculation of Relative Standard Deviation of SEI Layer Thickness Values Charge (CC-CV 0.33C 4.2V 0.05C CUT-OFF) and discharge (CC 0.33C 2.5V CUT-OFF) were performed at room temperature (25° C.) 100 times for the lithium secondary battery according to each of the above-described Examples and Comparative Examples.

Thereafter, three different composite particles were selected from one end portion in a length direction of the anode active material layer in the anode according to each of Examples and Comparative Examples, and three different composite particles were selected from the other end portion in the length direction of the anode active material layer in the anode, and three different composite particles were selected from a central portion of the anode active material layer in the length direction.

Thickness values of the SEI layer of the selected 9 different composite particles were measured using an XPS.

XPS Analysis Conditions
  i) X-ray type: Al k alpha, 1486.68 eV, 900 m Beam size
  ii) Analyzer: CAE (constant analyzer energy) Mode
  iii) Number of scans: C1s, F1s, O1s, P2p: 5 (Li1s: 20)
  iv) Pass energy: 20 eV
  v) Dwell Time: 50 ms
  vi) Ion gun: Ar monatomic ion gun
  vii) Ion energy: 4000 eV
  viii) Etch Cycle: 100 s
  ix) Total Levels: 15

Specifically, surfaces of the composite particles prepared according to Examples and Comparative Examples were etched using an argon ion gun, and the XPS analysis was performed to obtain a graph showing a lithium concentration and a carbon concentration according to an etching depth for each composite particle.

The etching depth at an intersection of the lithium concentration line and the carbon concentration line in the graph was evaluated as the thickness value of the SEI layer.

Figure 3:
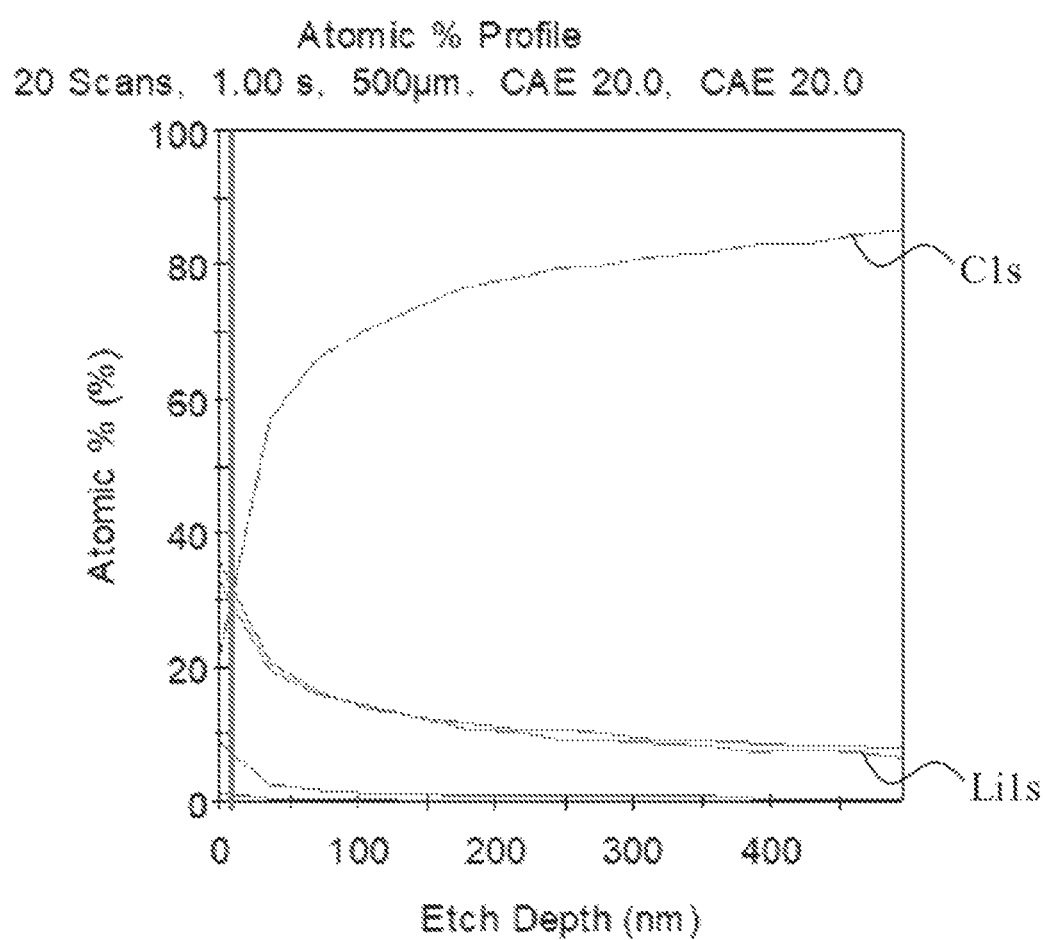
FIG. 3 is an exemplary graph showing a lithium concentration and a carbon concentration according to the etching depth of one composite particle among the composite particles of Example 1.

FIG. 3 is an exemplary graph showing a lithium concentration and a carbon concentration according to the etching depth of one composite particle among composite particles of Example 1. In this graph, the place where the Li concentration and the C concentration are equal is at a depth of 10 nm, and that depth would illustrate a SEI layer thickness.

A standard deviation of the obtained SEI layer thickness values of the nine composite particles was divided by an average of the SEI layer thickness values, and then multiplied by 100 to calculate a relative standard deviation (%).

(2) XPS Analysis: Evaluation on Thickness Increase Ratio of SEI Layer According to Repetition of Charging and Discharging For the lithium secondary batteries manufactured according to the above-described Examples and Comparative Examples, the thickness values of the SEI layer after the formation charging and discharging were measured under the same conditions and methods as those in Experimental Example (1). An average (initial thickness) of the measured SEI layer thickness values was calculated.

An average (100 cycle thickness) of the thickness values of the SEI layer after 100 cycles of charging and discharging measured in Experimental Example (1) was calculated.

A ratio of the average of the thickness values of the SEI layer after 100 cycles of charging and discharging to the average of the thickness values of the SEI layer after the formation charging and discharging was calculated and evaluated as a thickness increase ratio.

(3) Evaluation on Capacity Retention: 800 Cycles

Charge (CC-CV 0.33C 4.2V 0.05C CUT-OFF) and discharge (CC 0.33C 2.5V CUT-OFF) for the lithium secondary battery manufactured according to each of the above-described Examples and Comparative Examples were performed at room temperature (25 (C) 800 times.

A capacity retention was evaluated by a percentage ratio of a discharge capacity at the 800th cycle relative to a first discharge capacity at the 1st cycle.

The evaluation results are shown in Table 1 and Table 2 below.

TABLE 1

| No. | molar ratio of PAA-derived repeating unit | mixing time (mins) | solid content (wt %) | SEI layer thickness | | relative standard deviation (%) | thickness increase ratio |
|---|---|---|---|---|---|---|---|
| | | | | initial thickness (nm) | 100 cycle thickness (nm) | | |
| Example 1 | 0.40 | 20 | 65 | 5.1 | 17.7 | 14.8 | 3.47 |
| Example 2 | 0.40 | 30 | 65 | 5.3 | 17.5 | 14.6 | 3.30 |
| Example 3 | 0.55 | 30 | 65 | 5.5 | 17.5 | 14.1 | 3.18 |
| Example 4 | 0.25 | 30 | 65 | 5.4 | 17.3 | 19.3 | 3.20 |
| Example 5 | 0.70 | 30 | 65 | 5.5 | 17.7 | 18.4 | 3.22 |
| Example 6 | 0.40 | 50 | 65 | 5.2 | 17.6 | 14.9 | 3.38 |
| Example 7 | 0.40 | 8 | 65 | 5.1 | 17.8 | 17.3 | 3.49 |
| Example 8 | 0.40 | 120 | 65 | 6.4 | 19.2 | 17.7 | 3.00 |
| Example 9 | 0.40 | 15 | 65 | 5.0 | 18.1 | 19.6 | 3.62 |
| Comparative Example 1 | — | 30 | 65 | 5.1 | 18.6 | 22.5 | 3.65 |
| Comparative Example 2 | 0.40 | 0 | 65 | 4.4 | 18.9 | 34.2 | 4.30 |
| Comparative Example 3 | 0.40 | 30 | 45 | 4.6 | 18.7 | 24.8 | 4.07 |
| Comparative Example 4 | 0.40 | 30 | 82 | 4.7 | 18.6 | 25.6 | 3.96 |

TABLE 2

| No. | capacity retention (800 cycles) (%) |
|---|---|
| Example 1 | 87.9 |
| Example 2 | 88.4 |
| Example 3 | 88.6 |
| Example 4 | 85.1 |
| Example 5 | 84.6 |
| Example 6 | 88.2 |
| Example 7 | 85.9 |
| Example 8 | 82.7 |
| Example 9 | 82.3 |
| Comparative Example 1 | 79.9 |
| Comparative Example 2 | 79.6 |
| Comparative Example 3 | 79.7 |
| Comparative Example 4 | 80.2 |

Referring to Tables 1 and 2, in Examples where the relative standard deviation of the thickness values of the SEI layer after 100 cycles of charging and discharging was 20% or less, the capacity retentions were improved compared those from to Comparative Examples.

In Examples 1 to 3, the molar ratio of the PAA-derived repeating unit and the mixing time were within an appropriate range, and the relative standard deviations of the thickness of the SEI layer were reduced.

In Examples, an affinity of the carboxyl group (—COOH) included in the PAA-derived repeating unit and the FEC included in the electrolyte additive was enhanced to form the SEI layer having a uniform thickness.

In Example 4 where the ratio of the number of moles of repeating units derived from polyacrylic acid to the total number of moles of repeating units included in one molecule of the polyacrylic acid-based copolymer was 0.25 or less, the SEI layer had a non-uniform thickness compared those from other Examples.

In Example 5 where the ratio of the number of moles of repeating units derived from polyacrylic acid to the total number of moles of repeating units included in one molecule of the polyacrylic acid-based copolymer was 0.7 or more, the anode binder was not evenly adsorbed on the surface of the active material. Accordingly, the SEI layer had a less uniform thickness compared to those from other Examples.

In Example 7 where the mixing time of the anode active material and the anode binder was less than 10 minutes, a bonding strength between the anode active material and the anode binder was lowered compared to those from other Examples. Accordingly, the SEI layer had a less uniform thickness compared to those from other Examples.

In Example 8 where the mixing time of the anode active material and the anode binder exceeded 110 minutes, the thickness of the SEI layer increased after the formation charging/discharging compared to those from other Examples. Accordingly, the capacity retention was lowered compared to those from other embodiments.

In Example 9 where the thickness increase ratio of the SEI layer exceeded 3.6, the capacity retention was lowered compared to those from other Examples.

In Comparative Example 2 where the mixing process (secondary particle formation) of the anode active material and the anode binder was not performed, the bonding strength between the anode active material and the anode binder was lowered compared to those from Examples. Accordingly, the SEI layer after the formation charging and discharging had a thin and non-uniform profile compared to those from Examples. As a result, a resistance of the anode was increased, the capacity retention was decreased, and the thickness of the SEI layer after 100 cycles was increased due to side reactions.

In Comparative Example 3 where the solid content based on the total weight of the anode mixture was less than 50 wt %, the anode binder was not sufficiently combined with the anode active material during the mixing process. Accordingly, the SEI layer had a non-uniform profile compared to those from Examples.

In Comparative Example 4 where the solid content based on to the total weight of the anode mixture exceeded 80 wt %, mixing of the anode active material and the anode binder was not sufficiently performed, and irregular and partial secondary particle formation occurred. Accordingly, the SEI layer had a non-uniform profile compared to those from Examples.

What is claimed is:

1. A charged lithium secondary battery, comprising:
an anode, a cathode facing the anode, and a non-aqueous electrolyte solution comprising a lithium salt and a fluorine ethylene carbonate (FEC) additive;
wherein the anode comprises:
an anode current collector; and
an anode active material layer formed on at least one surface of the anode current collector, the anode active material layer comprising an anode active material and an anode binder,
wherein the anode active material comprises a plurality of composite particles, each of the composite particles comprises:
a silicon-based active material particle;
a carbon coating formed on the silicon-based active material particle; and
a solid electrolyte interphase (SEI) layer formed on the carbon coating after the battery is charged and discharged, and the SEI layer including LiF,
wherein a relative standard deviation of thickness values of the SEI layer formed on the carbon coating after the battery is charged and discharged, measured by an X-ray photoelectron spectroscopy (XPS) from 9 different composite particles among the plurality of composite particles after repeating 100 cycles of charging and discharging, is 20% or less,
wherein the anode binder includes a polyacrylic acid-based copolymer, and a ratio of a number of moles of repeating units, derived from polyacrylic acid, relative to a total number of moles of repeating units included in one molecule of the polyacrylic acid-based copolymer is greater than 0.25 and less than 0.7,
wherein the polyacrylic acid-based copolymer includes a polyacrylic acid-polyvinyl alcohol copolymer.

2. The charged lithium secondary battery of claim 1, wherein the silicon-based active material particle includes at least one selected from the group consisting of Si, $SiO_x$ ($0<x<2$), and a Si—C composite.

3. The charged lithium secondary battery of claim 1, wherein a ratio of a number of moles of repeating units, derived from polyacrylic acid, relative to a total number of moles of repeating units included in one molecule of the polyacrylic acid-based copolymer is in a range from 0.4 to 0.55.

4. The charged lithium secondary battery of claim 1, wherein the thickness value of the SEI layer is determined by an etching depth at a point where a lithium concentration and a carbon concentration measured by etching a surface of the composite particle using an argon ion gun of the XPS are the same.

5. The charged lithium secondary battery of claim 1, wherein three of the nine different composite particles are selected from one end portion in a length direction of the anode active material layer extending laterally across a surface of the anode current collector,
the other three of the nine different composite particles are selected from the other end portion in the length direction of the anode active material layer, and
another three of the nine different composite particles are selected from a central portion in the length direction of the anode active material layer.

6. The charged lithium secondary battery of claim 1, wherein a ratio of an average of the thickness values of the SEI layer, measured after the 100 cycles of charging and discharging, relative to an average of thickness values of the SEI layer measured after a formation charging and discharging is in a range from 1 to 3.6.

* * * * *